(12) United States Patent
Kreiling et al.

(10) Patent No.: US 7,571,951 B2
(45) Date of Patent: Aug. 11, 2009

(54) CABRIOLET VEHICLE

(75) Inventors: Nils Kreiling, Osnabrück (DE); Sven Hollenbeck, Westerkappeln (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 25 days.

(21) Appl. No.: 10/597,103

(22) PCT Filed: Jan. 15, 2005

(86) PCT No.: PCT/DE2005/000055

§ 371 (c)(1),
(2), (4) Date: Oct. 13, 2006

(87) PCT Pub. No.: WO2005/068239

PCT Pub. Date: Jul. 28, 2005

(65) Prior Publication Data
US 2007/0126258 A1 Jun. 7, 2007

(30) Foreign Application Priority Data
Jan. 20, 2004 (DE) .................. 10 2004 003 022

(51) Int. Cl.
*B60J 7/12* (2006.01)

(52) U.S. Cl. .................. 296/107.15; 296/107.09

(58) Field of Classification Search ............ 296/107.09, 296/108, 107.15, 224, 218
See application file for complete search history.

(56) References Cited

U.S. PATENT DOCUMENTS

| 6,343,829 | B2 * | 2/2002 | Busch | 296/107.15 |
| 6,637,802 | B2 * | 10/2003 | Obendiek | 296/108 |
| RE38,546 | E * | 7/2004 | Corder et al. | 296/108 |
| 7,029,053 | B2 * | 4/2006 | Heller et al. | 296/121 |

FOREIGN PATENT DOCUMENTS

| DE | 4336278 A | * | 4/1995 |
| DE | 10144583 A1 | * | 4/2003 |
| WO | WO 0243978 A2 | * | 6/2002 |

* cited by examiner

*Primary Examiner*—H Gutman
*Assistant Examiner*—Melissa A Black
(74) *Attorney, Agent, or Firm*—Quinn Law Group, PLLC; Christopher W. Quinn

(57) ABSTRACT

This invention relates to a cabriolet vehicle with a roof with a flexible cover in at least parts of its area, including a front roof area which can be stored in the same orientation as in the closed state in a body recess, which is bounded on the rear by an edge of the auto body. The outer surface of the front roof area is separated relative to the rear roof area lying farther rearward and provided with a cover, and the rear edge of the front roof area is adapted to the trend of the edge of body bounding the body recess on the rear.

19 Claims, 8 Drawing Sheets

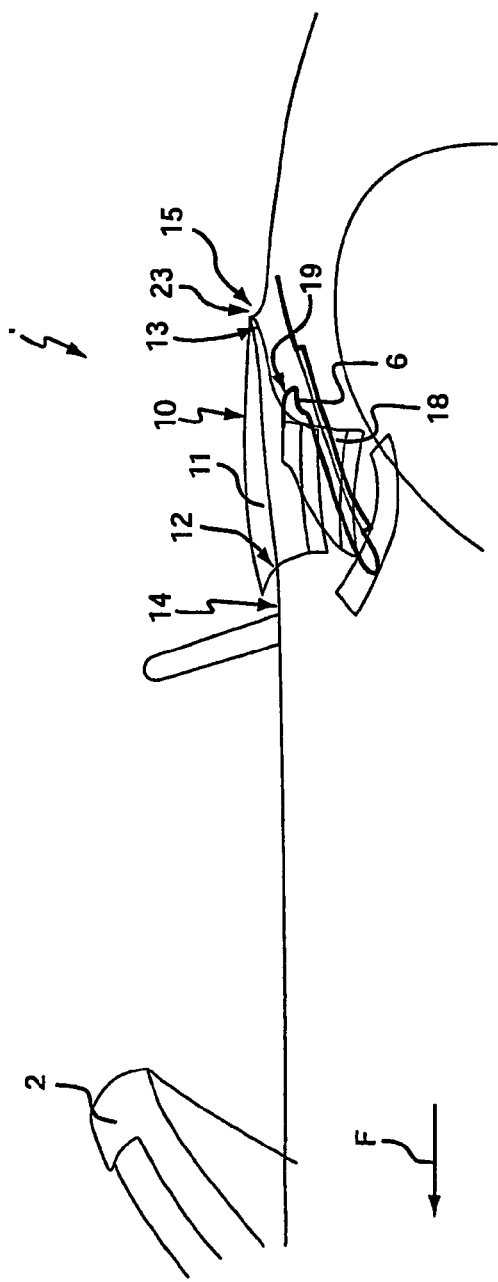

CABRIOLET VEHICLE

CROSS-REFERENCE TO RELATED APPLICATION(S)

This application is a US National Phase of International Application No. PCT/DE2005/000055, filed Jan. 1, 2005, which claims priority to German 10 2004 003 022.7, filed Jan. 20, 2004. The entire contents of the above identified applications are incorporated herein by reference.

TECHNICAL FIELD

The invention relates to a cabriolet vehicle with a roof which at least in some areas has a flexible cover according to the preamble of Claim 1.

BACKGROUND OF THE INVENTION

It is known that the front roof area in a cabriolet vehicle of the mentioned type, when the roof is opened, lies over other areas of the roof in the fashion of a cover and remains openly visible from the top for the most part. The roof then lies in a body recess made in the outside surface of the auto body. It encloses the recess at least on the sides and rear. In the front it is indirectly or often directly connected to a passenger compartment.

In this case, on the one hand the rear limitation of the recess, which represents a front edge of the body outside surface connected farther to the rear is designed in a curved shape, which runs forward to the vehicle sides for a harmonic transition of the edges bordering the recess.

On the other hand, a roof of the mentioned type, when opened, is supposed to fold in behind the rigidly held from below front roof area so that the folding edge there, if possible, runs at least almost linearly in a 90° angle relative to the direction of travel over the roof width in a top view in order to ensure a clean cover trend when the roof is closed without folds.

Consequently, a conflict arises on the edge of the limitation of the recess at least in the side corner areas between the essentially linear rear edge of the front roof part which then lies on the top, and the limitation edge of the recess which points forward on the transverse sides. If the corners of the front roof part during roof movement are supposed to be passed by the edge without collision, a significant spacing between the parts is therefore essential. Consequently, an elongated gap between the edge of the recess and the folding edge of the front roof part positioned to the rear remains at least in the area of the vertical vehicle longitudinal center plane in the vehicle longitudinal direction. Such gaps, however, are visually undesirable and without additional measures also make possible unauthorized access into the trunk situated beneath it.

An attempt to mitigate this conflict consists of providing for the rear end area of the recess a narrow moving hinged cover almost crescent-shaped in top view, whose rear edge lies essentially across the vehicle and whose front edge lies in the desired curvature with the forward facing transverse edge areas. This moving cover, however, requires additional drive and control expense and with its additional side joints interferes with the appearance of the outer surface of the auto body.

SUMMARY OF THE INVENTION

The underlying problem solved by the invention is to optimize storage of a roof with the front roof part lying in the storage position in the same orientation as in the closed position.

The invention solves this problem by a cabriolet vehicle with the features of Claim 1. With respect to additional advantageous embodiments of the invention, Claims 2 to 16 are referred to.

Through the invention the rear edge of the front roof area in the storage position of the roof does not represent a folding line for the cover and can therefore deviate significantly from a linear trend. This edge is therefore adaptable to any trend of the edge bounding the body recess rearward and therefore ensures a visually very advantageous parallel position of the rear edge of the front roof part and the edge bordering the recess for the roof. Both edges in the stored roof can lie very tightly in front of one another. An improvement is therefore achieved both visually and as a security against break-in.

If the separation joint during roof storage opens and the further roof area adjacent behind the rear edge of the front roof area can be placed under the front roof area, the front roof area can cover almost the entire body recess in the fashion of a cover without the additional roof areas provided with the cover being visible with the roof in the stored position. In particular a folding edge of the cover is therefore beneath and in front of the front roof area during opening so that the folding edge determined in its trend by the cover no longer reaches the vicinity of the body edge bounding the recess.

In particular, for a visually harmonic trend, the front roof area in the stored state of the roof can lie at roughly the same height with the bordering edge further behind and the further auto body outside surface. It need not lie underneath a possible pivoting cover, as in the prior art.

It is also visually particularly advantageous, if the remaining gap between the rear edge of the front roof area and the body edge bounding the recess is smaller than about 40 millimeters, especially smaller than 30 or even 20 millimeters. This is made possible by separation of the front roof area, which is not connected to a cover on its rear end. The break-in hazard in the gap is further reduced by the narrow dimensions of the gap.

If the edge of the body bounding the body recess extends over its trend in a top view so that it includes a component facing in the direction of travel on the vehicle transverse sides and the rear edge of the front roof area also includes components pointing in the direction of travel on the sides corresponding to the curvature of the body edge, a parallel position of the two mentioned edges is obtained, which can extend over almost the entire width of the body recess.

If the front roof area is designed overall as a rigid assembly, the manufacturing tolerances are minimized; in particular, the front roof area can then include a plate element that can be fastened on one end to the windshield frame and connected on the other end to the additional roof area including the cover so that it is visually uniform and effects a good protective function especially when the roof is opened. The plate element can be in one piece especially for simple manufacturing, and for weight reduction be made from a lightweight material, for example aluminum foam, magnesium die casting or plastic.

Adaptation of the plate element to the recess to accommodate the stored roof is optimized if it has an essentially convex shape in top view with a cambered front and rear edge.

Despite the separation joint, the areas of the roof can be reliably and stably held against each other if the front end of the further roof area adjacent to the front roof area is designed in the fashion of an ordinary roof top—but with a curvature opposite to it in the top view—and can be locked to the rear edge of the front roof area.

Through the invention the edge of the body adjacent to the body recess can at least in parts of its areas be the front edge of a trunk lid or a reinforcing cross bar of the auto body adjacent to which towards the rear the trunk lid is located. A pivoting cover is unnecessary.

Additional advantages and features of the invention are apparent from a practical example of the object of the invention depicted at least schematically in the drawing and described below.

BRIEF DESCRIPTION OF THE DRAWINGS

FIG. 8 shows a view similar to that of FIG. 7 with the roof completely opened.

DESCRIPTION OF THE PREFERRED EMBODIMENTS

Figure 1:
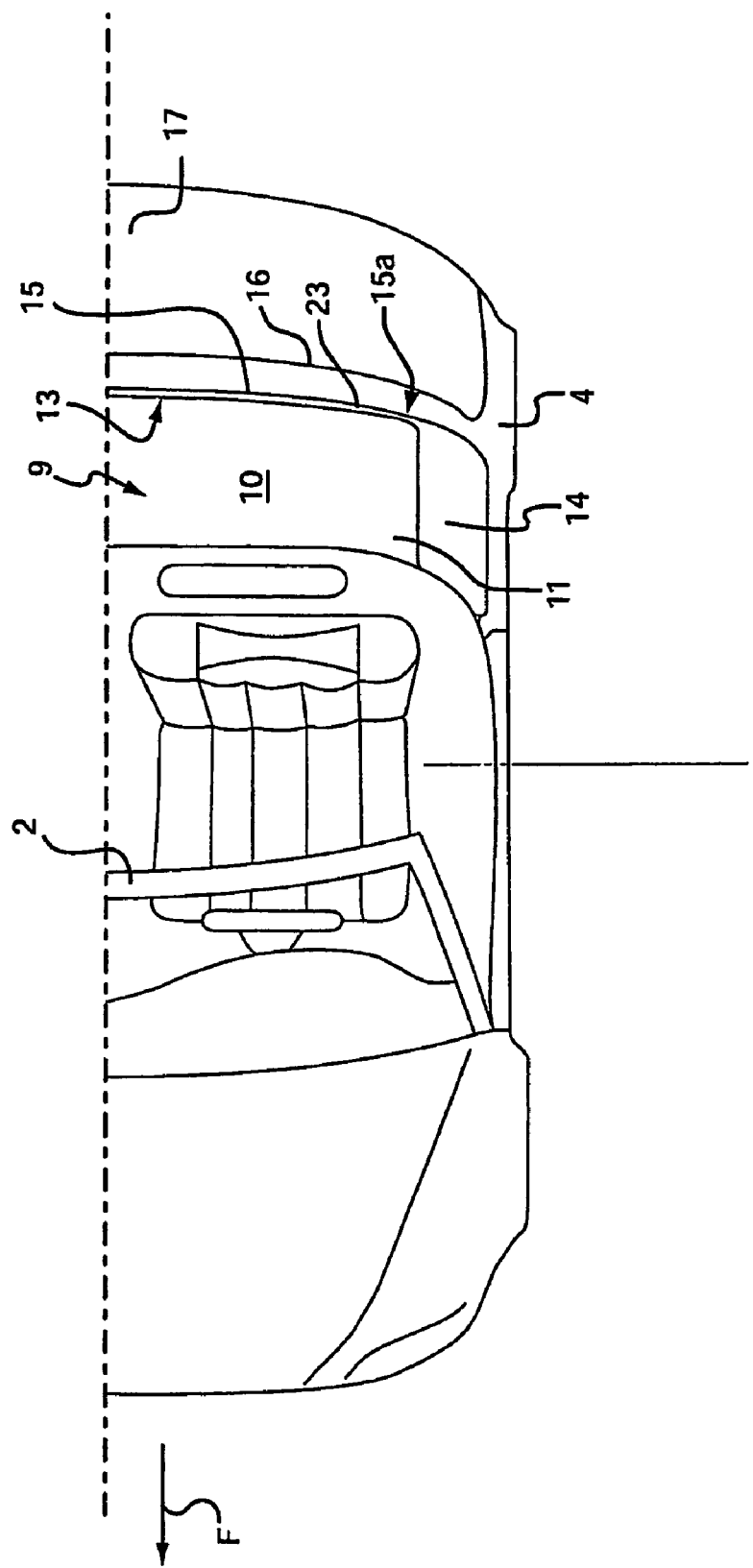
FIG. 1 shows a vehicle according to the invention in a schematic view from the top with the roof opened, truncated on the vertical longitudinal center plane.

In the drawing a two-seat vehicle 1 is shown. The invention is also applicable to a four- or multi-seat cabriolet vehicle provided with a rear seat.

The vehicle 1 in its upper area includes a moving roof 3 indirectly or directly adjacent to a windshield frame 2 and movable relative to body 4, whose outer skin is divided into a rear roof area 8 and a front roof area 9 with respect to the direction of travel F on a joint 7 extending over the entire width of the vehicle 1, and opening during roof opening. The rear roof area 8 includes in addition to a rear window 5 a flexible roof cover 6.

The front roof area 9 can be designed differently and also include a cover stretched over a frame, or, as in the practical example, include an overall rigid plate element 11 as outer surface 10 and therefore form a rigid assembly except for the moving rod parts. The plate element 11 is then connected with its front end 12 to the windshield frame 2, and with its rear edge 13 in the closed roof position (FIG. 2) to the rear roof area 8, in sealed fashion.

The edges 12 and 13 are each cambered so that the convex form of the front roof area 9 is produced in a top view.

The plate element can be formed in one piece for simple manufacture and for weight reduction from a lightweight material, for example plastic or light metal foam. It can be formed transparent, or with a color adapted to the cover 6.

The front roof area 9 during opening of the roof (transition from FIG. 2 to FIG. 1) can be stored in the same orientation as in the closed state in a body recess 14, i.e., the upward and outward pointing surface 10 of the front roof area 9 in the closed roof 3 also points upward in the opened state of roof 3.

The body recess 14 used to accommodate the opened roof 3 is bounded on the back and partly on the sides by an edge 15 of the auto body. This edge 15 has a curvature so that its side sections 15a include a component pointing in the direction of travel F. It therefore lies, at least in the middle vehicle area, parallel to a front closure edge 16 of a trunk lid 17 or can be formed by this lid itself.

The roof area 8 adjacent to joint 7 in the practical example depicted here is continuously overlapped by the cover 6, except for the rear window 5, which is not essential. In the front end area the cover 6 is held from below by a rigid transverse support 18, which is provided with locking devices in the fashion of a roof top. Since this "roof top", however, is not to be locked to the windshield frame 2 but to the rear edge 13 of the front roof area 9, the curvature of the transverse support is designed opposite the usual roof top, which would have its area extending farthest forward in the vehicle center.

Figure 2:
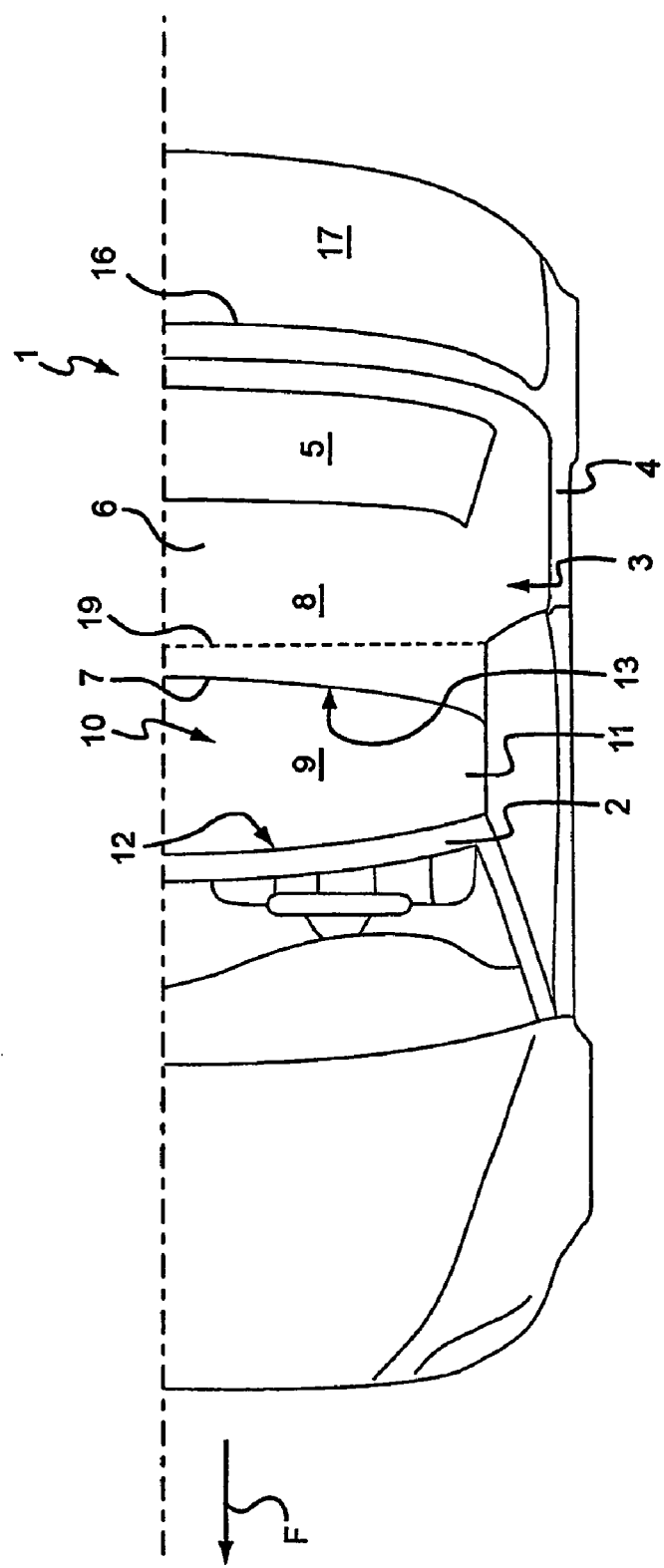
FIG. 2 shows a view similar to that of FIG. 1 but with the roof closed.

In the area of the rear edge 19 of the transverse support 18 a folding edge 19 for roof 3 is present, which is shown with a dashed line in FIG. 2. This folding edge 19 is continuously overlapped by cover 6.

Figure 3:
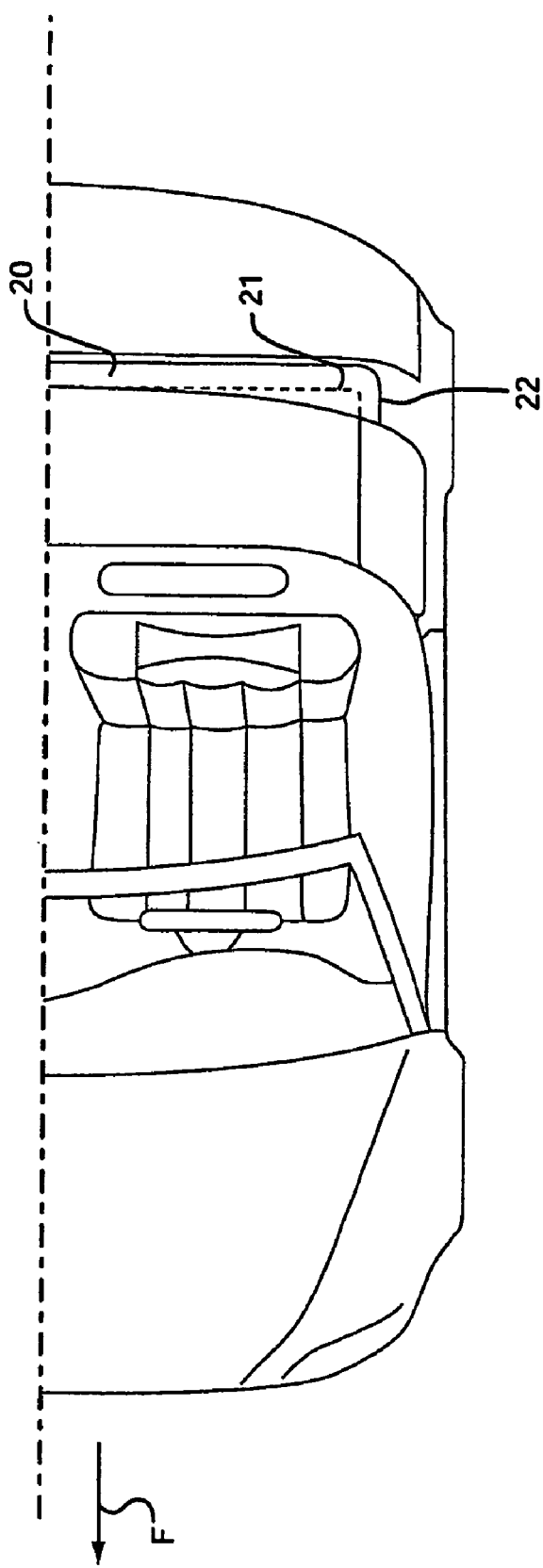
FIG. 3 shows a vehicle according to the prior art in a view similar to that of FIG. 1.
Figure 4:
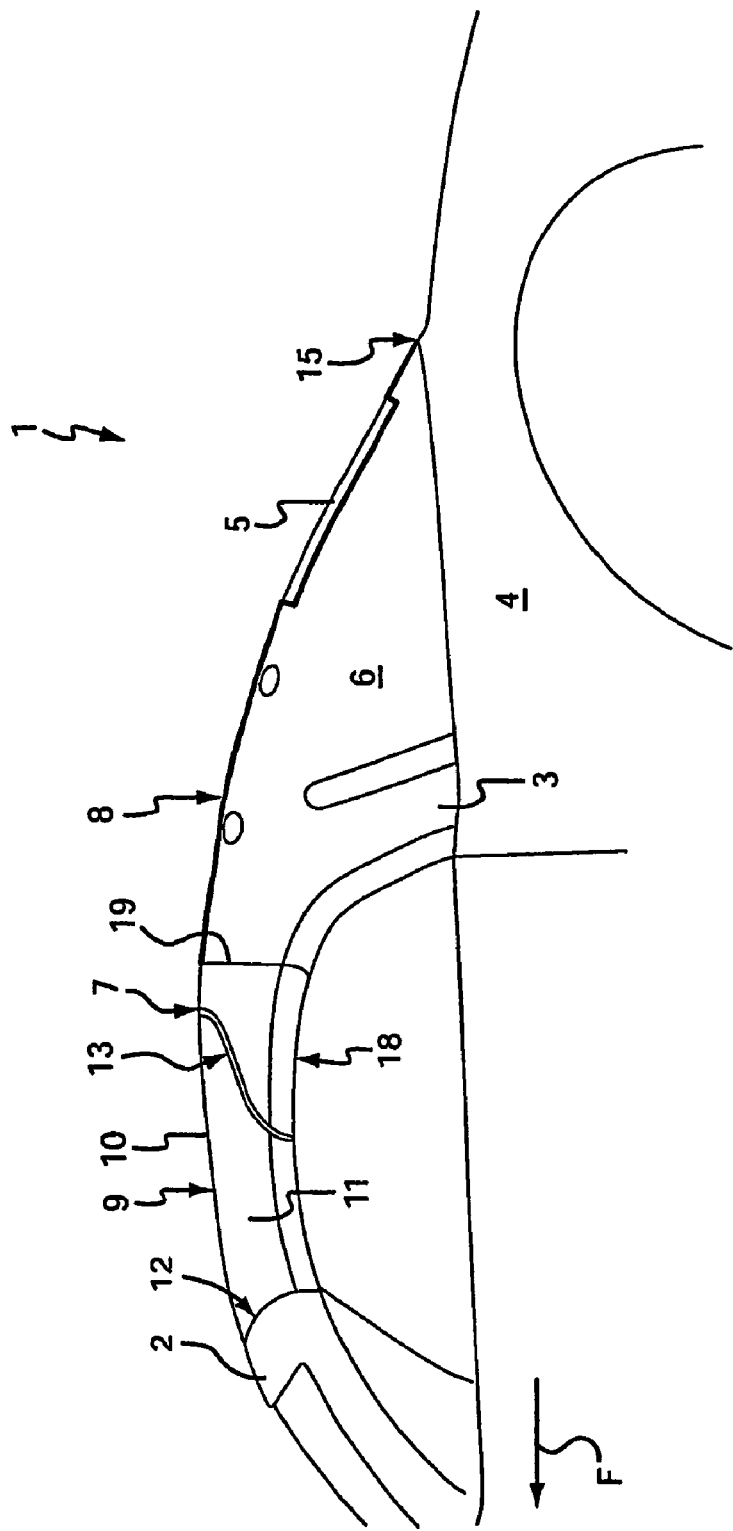
FIG. 4 shows a schematized side view truncated in the lower portion in the area of the vertical longitudinal center plane of the vehicle according to the invention with the roof closed and locked.
Figure 5:
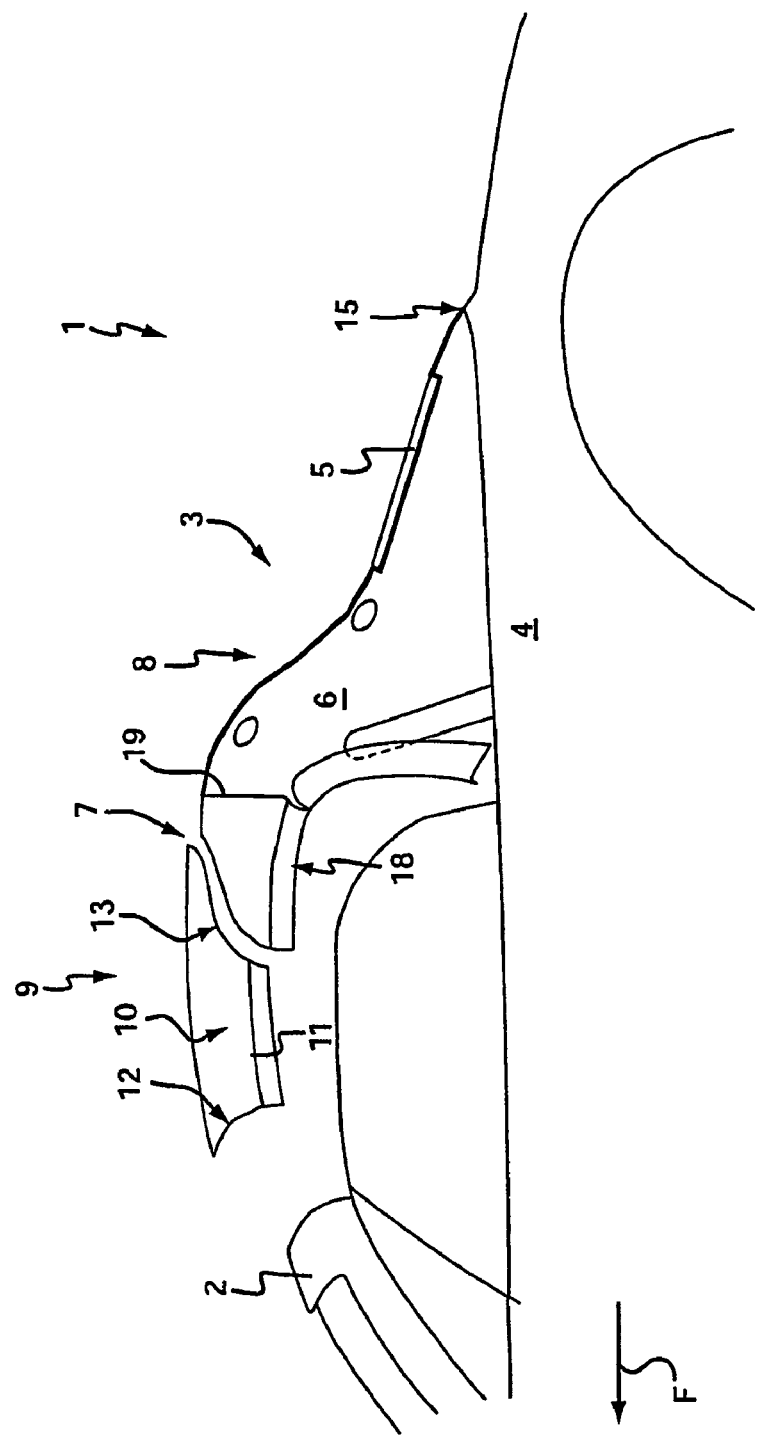
FIG. 5 shows a view similar to that of FIG. 4 at the beginning of roof opening.
Figure 6:
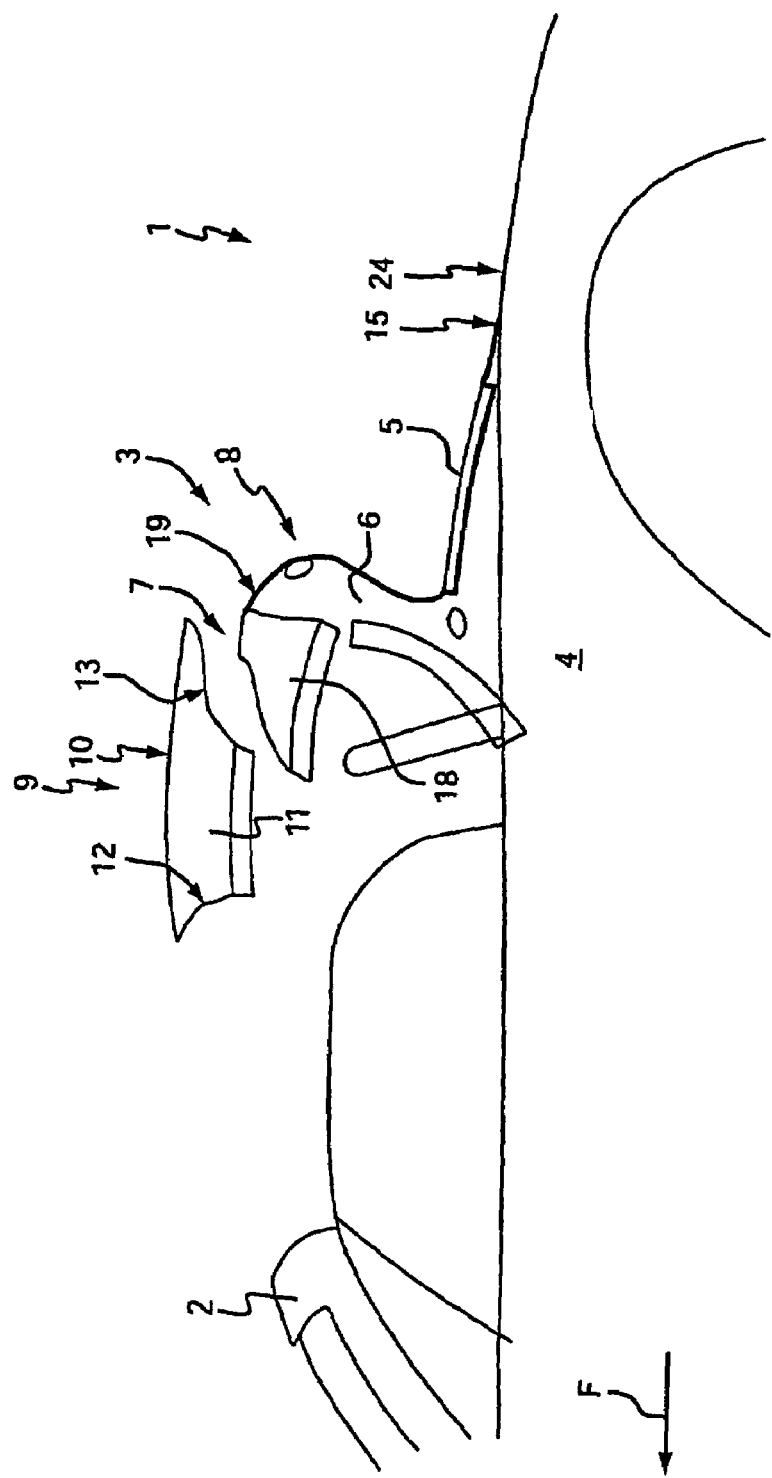
FIG. 6 shows a view similar to that of FIG. 5 with further advancing roof opening.
Figure 7:
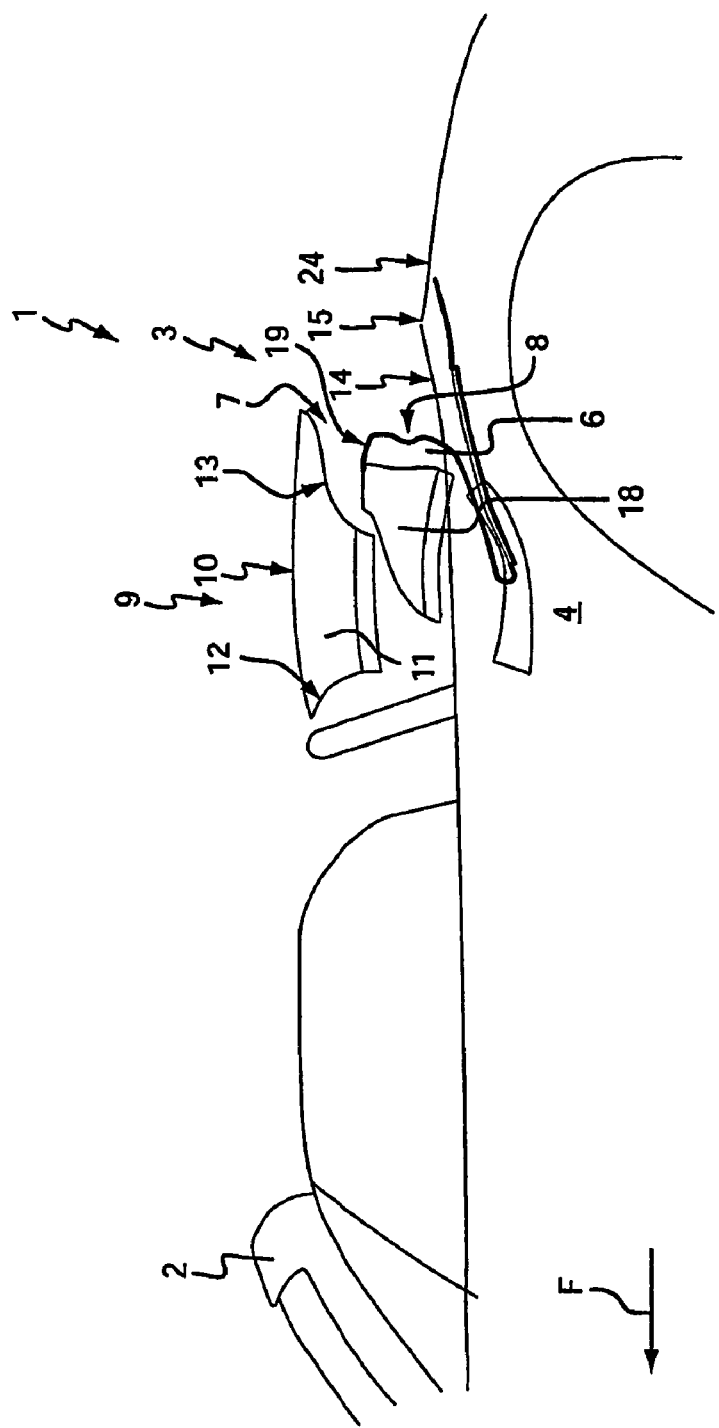
FIG. 7 shows a view similar to that of FIG. 6 with further advancing roof opening right before the completely opened position.

In the ordinary design, this folding edge 19 lying essentially at a 90° angle to the vehicle longitudinal direction, would form a separation of the front and rear roof part, i.e., the area from the windshield frame to this folding edge 19 would lie as the uppermost position of the roof in the body recess 14 (FIG. 3) so that a significant extent of this recess is required in the vehicle longitudinal direction. The rear limitation edge 15 would therefore have to be positioned very far rearward or, as shown in FIG. 3, additional pivot cover 20 would have to be provided, which can open for passage of roof 3 and therefore avoid a collision of the corner areas 21 (shown with a dashed line) with body 4. However, this requires the mentioned additional control expense and causes visually disadvantageous additional joints 22.

Consequently, the surface 10 forming the upper position of the stored roof only extends to the separation joint 7, so that the front roof area 9 is shortened and therefore requires less space in the stored position in the vehicle longitudinal direction.

In the stored roof position (FIG. 8) the folding edge 19 is no longer the rear edge of the upper roof surface 10, but the rear edge 13 of the plate element 11 that is lying much farther forward. The recess 14 can therefore be designed shorter and without a pivot cover. In addition, the closure edge 13, in contrast to folding edge 19, can be formed arbitrarily over the roof width and therefore be adapted precisely to the curvature of the edge 15 bounding the recess 14 and also have components on the sides pointing in the direction of travel F. There is then no longer a collision hazard of the corners 21 with edge 15. In the open state the edges 13 and 15 as well as the body outer surface 24 adjacent behind it can then lie parallel to each other in one plane with minimized spacing (FIG. 1). The remaining gap 23 can be uniformly narrower than 40 millimeters over the roof width, especially narrower than 30 or even 20 millimeters.

During the opening movement of roof 3 (FIG. 4 to FIG. 8), the separation joint 7 is opened, and the rear roof area 8 is displaced beneath the front roof area 9 so that the folding edge 19 is also overlapped by it, and migrates forward and downward relative to the rear edge 13 of the front roof area 9, where said edge 13 is lying farther forward when the roof is closed. Thereby the edge 13, as the upper rear edge of roof 3 in the stored position, reaches the position lying immediately below or in one plane in front of the body edge 15. Because of the shortening of the front roof area 9 achieved with the separation joint 7, the recess 14 can therefore have minimal dimensions. With tight contact of edge 13 against the body edge 15, a remaining gap 23 between the front roof part 9 and edge 15 is also minimized.

The invention is applicable both for manually and semi- or fully automatically moved roofs 3.

The invention claimed is:

1. Cabriolet vehicle (1) with a body (4) including a windshield frame (2) and a roof (3) which includes a front roof area (9) and a rear roof area (8), supported by a transverse support (18), wherein the front roof area (9) is movable between an open state and a closed state such that the front roof area (9) is storable in a body recess (14), which is bounded on a rear by an edge (15) of the body (4), in the open state in the same orientation as in the closed state, characterized by the fact that the rear roof area (8) is disposed rearward relative to the front roof area (9) and the front roof area (9) and the transverse support (18) of the rear roof area (8) are separated by a separation joint (7);

wherein the front roof area (9) is designed essentially as a rigid assembly;

wherein the transverse support (18) is rigid and includes a rear edge (19) continuously overlapped by a flexible cover (6);

wherein the rear roof area (8) is overlapped with the flexible cover (6) supported between the transverse support (18) and the rear edge (15) of the body (4);

wherein the rear roof area (8) folds along the rear edge (19) such that the rear roof area (8) and the transverse support (18) are displaced beneath the front roof area (9) and a rear edge (13) of the front roof area (9), at the separation joint (7), is adapted to the curvature of the edge (15) of the body (4) bounding the rear of the body recess (14) when the roof (3) is in the open state;

wherein a front edge (12) of the front roof area (9) is connected to the windshield frame (2) and a rear edge (13) of the front roof area (9) is connected to the transverse support (18) of the rear roof area (8) when the roof (3) is in the closed state;

wherein the transverse support (18) locks to the rear edge (13) of the front roof area (9) when the roof (3) is in the closed state.

2. Cabriolet vehicle (1) according to claim 1, characterized by the fact the roof area (8) adjacent behind the rear edge (13) of the front roof area (9) is displaced beneath the front roof area (9) when the roof (3) is in the open state.

3. Cabriolet vehicle (1) according to claim 1, characterized by the fact the front roof area (9) in the stored state of the roof (3) lies at approximately the same height with the edge (15) that is adjacent behind the front roof area (9) and an additional auto body outside surface (24) adjacent to the front roof area (9).

4. Cabriolet vehicle (1) according to claim 1, characterized by the fact that a remaining gap (23) between the rear edge (13) of the front roof area (9) and the auto body edge (15) bordering the recess is narrower than 40 millimeters.

5. Cabriolet vehicle (1) according to claim 1, characterized by the fact that the edge (15) of the auto body (4) bordering the auto body recess (14) extends in a curvature in a top view so that the edge (15) includes components on the vehicle transverse sides that point in a direction of travel (F) and the rear edge (13) of the front roof area (9) includes components pointing in the direction of travel (F) on the sides corresponding to the curvature of the auto body edge (15).

6. Cabriolet vehicle (1) according to claim 1, characterized by the fact that the front roof area (9) includes a plate element (11) that is connectable on one end to a windshield frame (2) and connected on the other end to the additional rear roof area (8) including the cover (6).

7. Cabriolet vehicle (1) according to claim 6, characterized by the fact that the plate element (11) includes an essentially convex shape in a top view with a cambered front edge (12) and a cambered rear edge (13).

8. Cabriolet vehicle (1) according to claim 6, characterized by the fact that the plate element (11) is in one piece.

9. Cabriolet vehicle (1) according to claim 6, characterized by the fact that the plate element (11) consists of a lightweight material.

10. Cabriolet vehicle (1) according to claim 1, characterized by the fact that the edge (15) adjacent to the body recess (14) in parts of its areas is parallel to a front edge (16) of a trunk lid (17).

11. Cabriolet vehicle (1) according to claim 1, characterized by the fact that the edge (15) adjacent to the auto body recess (14) in parts of its areas is a front edge (16) of a cross bar of an auto body outer surface (24) arranged in front of a trunk lid (17).

12. Cabriolet vehicle (1) according to claim 6, characterized by the fact that the edge (15) adjacent to the body recess (14) in parts of its areas is parallel to a front edge (16) of a trunk lid (17).

13. Cabriolet vehicle (1) according to claim 6, characterized by the fact that the edge (15) adjacent to the auto body recess (14) in parts of its areas is a front edge (16) of a cross bar of an auto body outer surface (24) arranged in front of a trunk lid (17).

14. A roof (3) that is movable between a closed state and an open state for a cabriolet vehicle (1) having a body (4), the roof (3) comprising:

a front roof area (9) extending between a front edge (12) and a rear edge (13);

wherein the front roof area (9) is substantially rigid;

a rear roof area (8);

wherein the rear roof area (8) is disposed rearward of the front roof area (9) and a separation joint (7) is defined between the rear roof area (8) and the front roof area (9) when the roof (3) is in the closed state;

a transverse support (18) supporting the rear roof area (8) adjacent the separation joint (7);

wherein the transverse support (18) locks to the rear edge (13) of the front roof area (9) when the roof (3) is in the closed state;

wherein the transverse support (18) is rigid and includes a rear edge (19) continuously overlapped by a flexible cover (6);

wherein the rear roof area (8) is overlapped with the flexible cover (6) supported between the transverse support (18) and the rear edge (15) of the body (4).

15. A roof (3), as set forth in claim 14, wherein the rear edge (12) of the front roof area (9) is connected to the rear roof area (8) at the transverse support (18) when the roof (3) is in the closed state.

16. A roof (3), as set forth in claim 14, wherein the front edge (13) of the front roof area (9) is connectable to a windshield frame (2) of the body (4) when the roof (3) is in the closed state.

17. A roof (3), as set forth in claim 14, wherein the rear roof area (8) and the transverse support (18) are disposed beneath the front roof area (9) when the roof (3) is in the open state.

18. A roof (3), as set forth in claim 14, wherein the rear edge (13) of the front roof area (9) is adapted to the curvature of an edge (15) of the body (4) when the roof (3) is in the open state.

19. A roof (3) for a cabriolet vehicle (1) having a body (4) and movable between an open state and a closed state, the roof (3) comprising:
   a front roof area (9);
   wherein the front roof area (9) includes a plate element (11) that is rigid on an outer surface (10) and extending between a front edge (12) and a rear edge (13);
   a rear roof area (8) supported by a transverse support (18);
   wherein the front roof area (9) is movable between the open state and the closed state such that the front roof area (9) is storable in a body recess (14), which is bounded on a rear by an edge (15) of the body (4), in the open state in the same orientation as in the closed state;
   wherein the transverse support (18) of the rear roof area (8) is disposed rearward relative to the plate element (11) of the front roof area (9) such that the plate element (11) of the front roof area (9) and the transverse support (18) of the rear roof area (8) are separated by a separation joint (7) when the roof (3) is in the closed state;
   wherein the transverse support (18) is rigid and includes a rear edge (19) continuously overlapped by a flexible cover (6);
   wherein the rear roof area (8) is overlapped with the flexible cover (6) supported between the transverse support (18) and the rear edge (15) of the body (4);
   wherein the rear roof area (8) folds along the rear edge (19) such that the rear roof area (8) and the transverse support (18) are displaced beneath the front roof area (9) and a rear edge (13) of the plate element (11), at the separation joint (7), is adapted to the curvature of the edge (15) of the body (4) bounding the rear of the body recess (14) when the roof (3) is in the open state.

* * * * *